No. 892,736. PATENTED JULY 7, 1908.
W. C. JONES.
FOLDING HAY RAKE.
APPLICATION FILED FEB. 21, 1908.
2 SHEETS—SHEET 1.
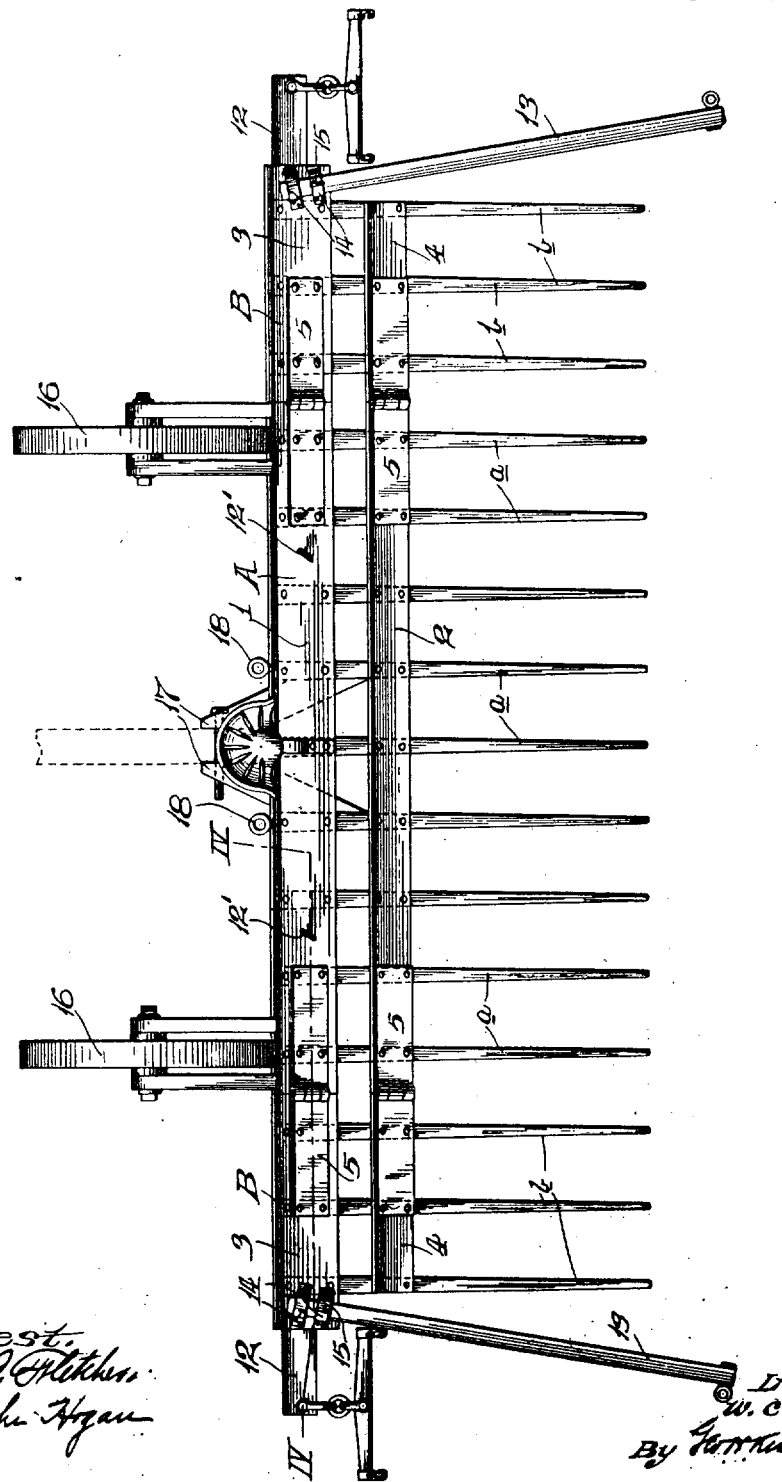

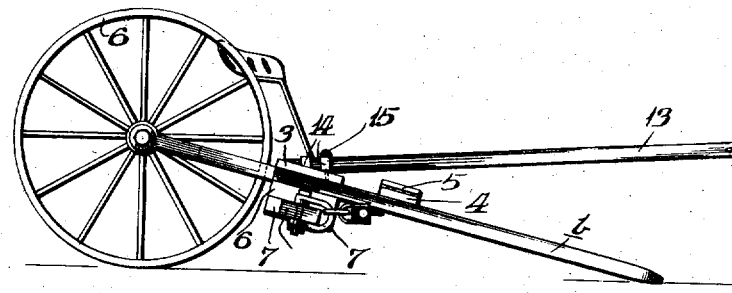
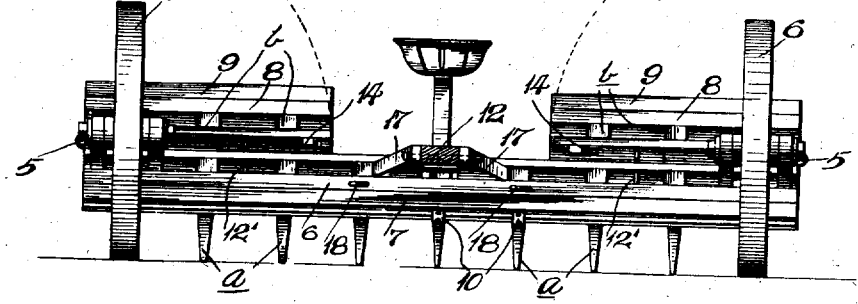
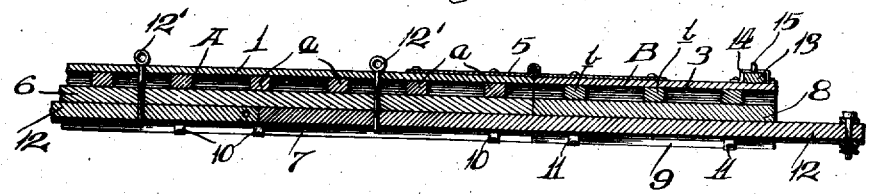

UNITED STATES PATENT OFFICE.

WILLIAM C. JONES, OF CURRYVILLE, MISSOURI.

FOLDING HAY-RAKE.

No. 892,736.  Specification of Letters Patent.  Patented July 7, 1908.

Application filed February 21, 1908. Serial No. 417,052.

*To all whom it may concern:*

Be it known that I, WILLIAM C. JONES, a citizen of the United States of America, residing in Curryville, in the county of Pike and State of Missouri, have invented certain new and useful Improvements in Folding Hay-Rakes, of which the following is a full, clear, and exact description, reference being had to the accompanying drawings, forming part of this specification.

My invention relates to that character of rakes which comprise a frame and fingers projecting forwardly from said frame by which, in the use of the rake, hay is gathered until the rake is loaded and after which the rake is drawn to a point at which it is to be stacked.

Rakes of the character named as heretofore made, are of very considerable dimensions, especially in length and they cannot therefore be readily transferred upon the ground to and from the fields in which they are to be used and it has been the common practice among farmers to load them upon wagons when they are being taken to and from the field, or transferred from one field to another.

It is the object of my invention to construct a rake of the kind named in folding form in order that its length may be reduced, thereby making it possible to readily transfer the rake from one point to another and provide for its passage through gateways when it is being hauled to and from the field or from one field to another.

Figure I is a top or plan view of my folding rake in condition for service. Fig. II is a side elevation of the rake. Fig. III is a rear elevation of the rake in folded position. Fig. IV is a longitudinal section taken on line IV—IV, Fig. I through a portion of the frame of the rake in unfolded condition.

In the accompanying drawings: A designates the central or main section and B the end or folding sections of my rake. The main section A includes rake fingers $a$ while the folding sections B include rake fingers $b$.

1 designates the rear top frame bar of the main section and 2 the forward top frame or tie bar of the main section to which the fingers $a$ are attached.

3 are the rear top frame bars of the folding sections B and 4 are the forward top frame or tie bars of said sections to which the fingers $b$ are attached.

5 are hinges that connect the frame bars 3 and 4 to the frame bars 1 and 2, thereby providing for the unfolding of the sections B into alinement with the main section A as seen in Figs. I, II and IV, and the folding of said sections B into positions above the main section, as seen in Fig. III.

Beneath the fingers $a$ of the main section A of the rake and the rear top frame bar 1 is a lower frame bar 6 and attached to said lower frame bar at the bottom thereof are front and rear strips 7 which extend longitudinally of the frame bar surmounting them to provide a channel between them. Beneath the fingers $b$ of the rake sections B and the rear top frame bars 3 are lower frame bars 8 beneath which are strips 9 that are adapted to extend in alinement with the strips 7 of the main sections when the sections B are unfolded, thereby providing a continuous channel that extends beneath the lower frame bars 6 and 8 and between the bottom strips 7 and 9 throughout the length of the frame of the rake.

10 are guard straps attached to the bottom strips 7 of the main section A and 11 are guard straps attached to the bottom strips 9 of the sections B. These straps extend transversely across the channels between the bottom strips.

12 designates locking bars that are adapted to be slid into the channels between the bottom strips of the sections of the rake when the sections B are unfolded and which are upheld in their positions in these channels by the guard straps 10 and 11, thereby causing the locking bars to hold the folding sections of the rake in extended positions when the rake is in use. After the locking bars are introduced into the channels as stated, they are secured therein by removable retaining pins 12' that are passed through perforations provided for them in the frame bars 1 and 6 and in the locking bars, as seen in Fig. IV. The locking bars have the utility, in addition to that specified, of providing draft members for the rake, inasmuch as they project when in service beyond the ends of the folding sections B so that draft appliances such as clevises and whiffle-trees may be connected thereto, as illustrated in the drawings.

13 are poles or arms to which the breast straps of the draft animals used in pulling the rake may be attached. These poles are detachably fitted to loops 14 mounted on the frames of the folding sections of the rake and they are held to said frames when the rake is in use by retaining pins 15.

When the rake is to be transferred from one point to another the locking bars 12 are withdrawn from the rake, thereby permitting the sections B to be folded over onto the main or central section A. The rake may then be readily hauled by hitching the draft animals thereto at the rear of its frame, at which time the ground wheels 16 journaled in arms extending from said frame provide for the support of the frame in the same manner as they provide for such support when the rake is in service. In hauling the rake in its folded condition one of the locking bars 12 may be utilized as a draft tongue and be mounted between a pair of arms 17 that extend rearwardly from the frame of the main section A and the whiffle-trees to which the draft animals are attached may be connected to suitable draft members, such as I-bolts 18 that are seated in the frame of the main section.

I claim:

1. A hay rake of the character described, comprising a main section, end sections foldably connected to said main section, and means whereby said end sections are held in alinement with said main section when the rake is in an unfolded condition; said last named means being extended beyond the ends of said end sections to provide for the application of draft appliances thereto, substantially as set forth.

2. A hay rake of the character described, comprising a main section provided with a channel, and guards extending across said channel, end sections foldably connected to said main section, and provided with channels, and guards extending across said channels, and locking bars insertible into said channels to hold said end sections in alinement with said main section when the rake is in an unfolded condition, substantially as set forth.

3. A hay rake of the character described, comprising a main section, end sections foldably connected to said main section, means for holding said end sections in alinement with said main section when the rake is in an unfolded condition, and poles extending forwardly from said end sections, substantially as and for the purpose set forth.

WILLIAM C. JONES.

In presence of—
W. L. Crow,
O. B. Hawkins